Patented May 5, 1953

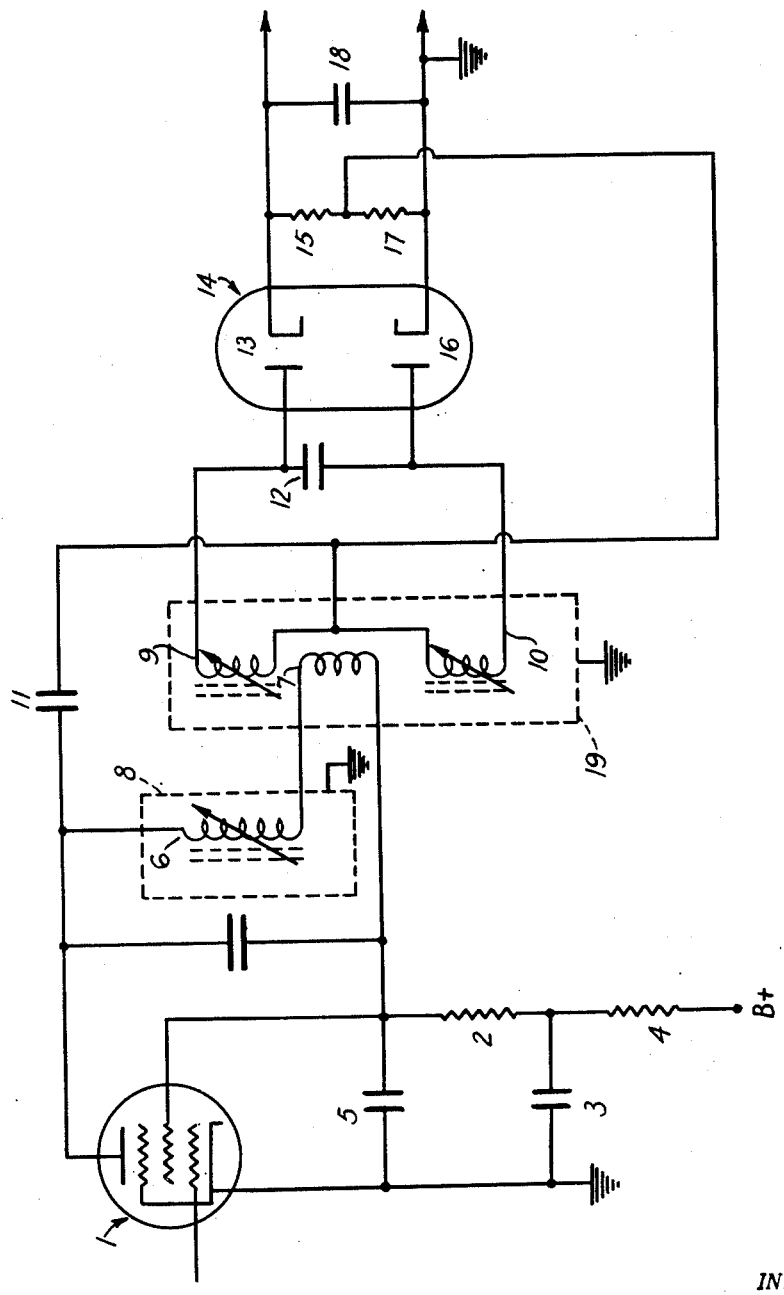

2,637,809

UNITED STATES PATENT OFFICE 2,637,809

COUPLING FOR FREQUENCY MODULATION DISCRIMINATORS

Joseph C. Spindler, Chicago, Ill., assignor to The Rauland Corporation, Chicago, Ill., a corporation of Illinois Application November 1, 1947, Serial No. 783,567

3 Claims. (Cl. 250—20)

This invention relates to improvements in the circuits of receivers of frequency modulated signals. More particularly, it relates to improved circuits, including improved double tuned transformer couplings, for discriminators of frequency modulated signals.

It is well known that the most widely used discriminators, i. e. devices for converting frequency variations into amplitude variations and for thereafter detecting the modulating component, are of the type comprising a double tuned transformer coupling having a primary which receives a single input, and a secondary which separately feeds two outputs to two conventional detector circuits, and an in-series arrangement of the detector load resistors for algebraically adding together the voltages separately developed across them. For maximum linearity and symmetry of the response curve of such a discriminator it is desirable that the secondary of its coupling have a center tap located at its true electrical center and that the two halves of the secondary be equally coupled to the primary. It is the general practice to seek to obtain these conditions by close control of manufacturing accuracy, and to make little if any provision for adjusting a transformer coupling which has been inaccurately manufactured or has gotten out of adjustment. In usual practice the primary consists of a winding with a tunable condenser in shunt thereto. No means is provided for varying the inductance of this winding probably because of the fact that adjustments, such as movements of a core of high permeability, would in a conventional arrangement tend to unbalance the coupling of the primary to the two halves of the secondary. The shunt condenser is normally adjusted so that the primary is anti-resonant at the carrier frequency and it is hoped that it can be left that way. The secondary ordinarily consists of a single winding which has a center tap and is in shunt to a variable condenser. It is customary not to provide any means for varying the self-inductance either of the secondary as a whole or of either of its halves. Instead manufacturing accuracy is again relied on, this time for locating the "center tap" at the exact electrical center. The shunt condenser is used for tuning the secondary to anti-resonance at the carrier frequency. Once a coupling of this type has been manufactured with any inaccuracy as to the location of the secondary center tap and/or as to the equality of coupling between the primary and the two secondary halves, very little can be done about it. The best that has been done is unsatisfactory. This consists of trying at random different combinations of detunings of the primary and the secondary in an effort to produce distortion of the discriminator characteristic which will exactly oppose and compensate for distortion therein produced by one or more of the inaccuracies mentioned above. The difficulty with this method is that while asymmetry of one of the two possible types may be used to compensate for that of the other, e. g. unequal coupling may be used to compensate for electrical displacement of the center tap or vice versa, neither asymmetry nor any combination of them can be directly opposed in a clean-cut and predictable manner by detunings of the primary or secondary alone or in combination. Moreover, in neither case can the actual inaccuracy be directly corrected. For example an electrically off-center "center tap" cannot be shifted to on-center. At best its effects may be compensated for, and this is not certain. The lack of flexibility of their transformer couplings has been a serious shortcoming in discriminators of the prior art. Moreover, the fact that these couplings must of necessity include lumped capacitance in both the primary and the secondary (since tuning is accomplished by capacity variations) is a disadvantage at high frequencies where one of the primary problems is to keep down circuit shunt capacitance. The portion of this discriminator which is connected to the output side of its transformer coupling is well known. A detector circuit, such as a diode and a load resistor which is in series therewith and is by-passed by a condenser, is connected across each half of the secondary, the load resistors of the two detectors being in series. Energy is fed to the secondary via the inductive coupling between the primary and the secondary and, in addition, there is a direct connection from one end of the primary, usually over a direct current blocking condenser, to the center tap of the secondary, the reasons for this being well known.

It is an object of the present invention to devise an improved transformer coupling in which the electrical position of a "center tap" of the secondary is variable after manufacture by simple adjustments.

It is a further object of the present invention to devise an improved transformer coupling in which the electrical position of the "center tap" is readily adjustable after manufacture either to the electrical center of the secondary when the values of coupling between the primary and the two halves of the secondary are equal, or to some off-center position to compensate for electrical effects produced when the values are unequal.

It is a further object of the present invention to devise an improved transformer coupling in which the self-inductances of the primary and of each half of the secondary can be individually varied by moving cores of high permeability, without affecting the coupling between the primary and either half of the secondary, for tuning the primary and secondary and for electrically positioning the "center tap" of the secondary.

It is a further object of the present invention to devise an improved transformer coupling employing permeability tuning of the primary and secondary thus eliminating the need for variable capacitors to make possible decreases in the physical size of the couplings and increases in their input impedance.

It is a further object of the present invention to devise an improved discriminator employing a transformer coupling of improved flexibility and efficiency as stated above.

Other objects, features and advantages of this invention will be apparent from the following detailed description of the invention and from the drawing in which the single figure is a representation of the circuit of a discriminator according to the present invention.

In Fig. 1 tube 1 is the output tube of the intermediate frequency amplifier of an FM receiver or of the sound channel of a television receiver. The screen grid of tube 1 is energized over resistor 2 from a source of direct potential, B+, which, if desired, may be connected to resistor 2 over a decoupling network comprising a condenser 3 and another resistor 4, and the screen grid is grounded as to intermediate frequency signals over by-pass condenser 5. The anode of tube 1 is energized from the same source over resistor 2 and a primary 6, 7 of a transformer coupling in series with the resistor. The anode-circuit ground-return for intermediate frequency signals is over primary 6, 7 and by-pass condenser 5. Primary 6, 7 consists of two portions, a portion 6, the self-inductance of which may be varied by moving a core of high permeability, and a portion 7 which, though it is in series with portion 6, is situated sufficiently distant therefrom to be unaffected by movements of the core. Portion 6 may be enclosed within a shield 8 to reduce any direct coupling between it and other elements of the transformer coupling. The secondary of the transformer coupling includes two halves 9 and 10, each of which is inductively coupled to portion 7 of the primary and each of which can be varied in its self-inductance by movements of a core of high permeability. The values of coupling between portion 7 and half 9 and portion 7 and half 10 are equal to each other and are fixed (by controlling such factors as the proximity of the coupled elements and the relative directions of their flux lines) at a value selected in accordance with usual considerations. For example, it is well known that a desired length for the linear portion of a discriminator characteristic can be obtained by controlling, among other things, the Q of its transformer coupling and that this, in turn, is done by controlling, in addition to the values of the diode load resistors, the degree of coupling between the primary and the secondary. While in certain embodiments portion 7 may be mounted on adjustable supporting means to permit control, after manufacture, of the values of its coupling to halves 9 and 10, this is not necessary in accordance with the present invention. For should these values turn out to be unequal through manufacturing inaccuracy this coupling is otherwise adjustable to effect direct and adequate compensation as distinguished from adjustment of the values themselves.

The I. F. output signal from the anode of tube 1 is directly coupled over a direct current blocking condenser 11 to the point of juncture between secondary halves 9 and 10, i. e. to the point corresponding to the secondary "center tap" of a conventional coupling.

The tuned secondary of the coupling herein includes a condenser 12 in shunt to its series connected secondary halves. This condenser may be made variable for increased flexibility. A diode 13, which may be one section of a double diode 14, is connected across secondary half 9 over load resistor 15 and similarly a diode 16 is connected across secondary half 10 over its in-series load resistor 17. Resistors 15 and 17 are connected in series to form an output circuit with by-pass for intermediate frequencies provided by shunt condenser 18; all of this being a well known arrangement for discriminator circuits. The output voltage is taken across both resistors and therefore it equals, at any instant of time, the algebraic sum of voltages separately developed across each of them. The operation of discriminators is well known and will not be fully described herein for the purpose of explaining this invention.

The tuned primary of the embodiment shown in Fig. 1 does not include a condenser as such, i. e. does not include deliberately added lumped capacitance. This is possible herein since the primary is tuned by variations in inductance rather than in capacitance. In other words the capacitance of this anti-resonant circuit consists solely of the anode-to-cathode capacitance of tube 1 and the stray and distributed capacitance of the circuit and this is possible since there is no need for a variable capacitor. However, where desired, for example for low frequency operation, a condenser may be added to the primary circuit in shunt to primary 6, 7. This is indicated in Fig. 1 by a dotted line indication of a condenser and connections thereof. By omitting this condenser the shunt capacitance of the circuit can be reduced to a minimum. It is well known that the input impedance of an anti-resonant circuit becomes higher as the shunt capacitance thereof is reduced (of course, while the inductance is being appropriately increased to maintain anti-resonance at the same frequency) and that this, in certain circuit arrangements, increases both gain and efficiency. The omission of lumped capacitance is particularly suitable where, as in existing television and frequency modulation channels, the carrier is of very high frequency and accordingly a high intermediate frequency is selected.

The coupling of Fig. 1 may be adjusted as follows: First, and in all cases, the primary is tuned to the carrier frequency by adjusting the self-inductance of portion 6 and it is allowed to remain so tuned. The remaining adjustments are made in one way in some cases and in a different way in all other cases. In cases where the values of the coupling of portion 7 to secondary halves 9 and 10 are equal, the self-inductances of the secondary halves are adjusted so that their individual values are equal—thus causing their junction to be electrically located at the center of the secondary—and so that their combined value is correct for tuning the secondary to the same frequency as that to which the primary is tuned. In cases where the values of the coupling of portion 7 to secondary halves 9 and 10 are unequal (through manufacturing inaccuracy), the self-inductances of the secondary halves are adjusted so that their individual values are appropriately unequal for displacing their junction sufficiently from the electrical center of the secondary to compensate for the effect produced on the discriminator characteristic by the inequality of coupling, and so that their combined value is correct for tuning the secondary to the same frequency as that to which the primary is tuned. When either of these procedures is followed the end results will be that both the primary and the secondary will be tuned to the carrier frequency and that the discriminator characteristic will be linear and symmetrical.

Both halves 9 and 10 of the secondary and portion 7 of the primary may be enclosed in a grounded shield 19 to prevent undesired coupling between the secondary halves and other elements of the circuit. In addition the movable cores of each of the secondary halves 9 and 10 should be positioned at a sufficient distance from portion 7 and from the other secondary half so that its movements will affect only the self-inductance of its own half (not that of portion 7 or of the other half) and will not affect the coupling of portion 7 to either of the halves. Thus each movable core should have no direct significant effect on coupling at all and its effect on self-inductance should be limited to the secondary half with which it cooperates.

While the transformer coupling of the present invention is particularly adaptable to use in a discriminator, its usefulness is not restricted thereto. It may be used in a variety of circuits requiring a tuned transformer coupling with the same characteristics as those of the coupling described herein.

While it will be preferable for most embodiments to employ movable cores of high permeability for varying the self-inductances of portions of the primary and the secondary, it is not essential that such cores be employed. For certain embodiments it will be alternately feasible to employ movable conductive slugs of the kind which reduce the self-inductance of a coil as it is brought into closed engagement therewith instead of increasing it in the manner of a core of high permeability. The use and manner of operation of such slugs are well known and need not be further described herein. Of course, conductive slugs should only be used in circuits where the resulting increased losses and lowerings of Q can be tolerated.

Of course, the electrical location of the juncture of the two secondary halves could be controlled even in an embodiment in which the self-inductance of only one of the halves is made variable. However, in such an embodiment it would be necessary for condenser 12 to be variable so that the secondary could be tuned as desired.

What is claimed is:

1. In a frequency-modulation receiver including an intermediate frequency amplifier, a frequency discriminator comprising: a pair of electron discharge devices each having first and second electrodes; a pair of impedance elements series connected between said first electrodes; first and second series connected inductance coils inductively isolated from each other and coupled to said amplifier to form a component of a tuned output circuit therefor; an adjustable element for varying the inductive value of said first inductance coil to tune said output circuit to the selected intermediate frequency of said receiver; a winding comprising a further pair of series connected inductance coils connected between said second electrodes and individually inductively coupled to said second inductance coil; a connection extending from the junction of said further pair of said inductance coils to the junction of said impedances; and separate adjustable elements for individually varying the respective inductances of said last-mentioned inductance coils to values having a relation effective to establish the junction of the latter coils at a selected electrical point on said winding and having a combined value effective to tune said winding to a predetermined frequency.

2. In a frequency-modulation receiver including an intermediate-frequency amplifier, a frequency discriminator comprising: a pair of electron discharge devices each having first and second electrodes; a pair of impedance elements series connected between said first electrodes; first and second series connected inductance coils inductively isolated from each other and coupled to said amplifier to form a component of a tuned output circuit therefor; an adjustable element for varying the inductive value of said first inductance coil to tune said output circuit to the selected intermediate frequency of said receiver; a winding comprising a further pair of series connected inductance coils connected between said second electrodes and individually inductively coupled to said second inductance coils with equal coupling values; a connection extending from the junction of said further pair of inductance coils to the junction of said impedances; and separate, permeability adjusting elements for respectively varying the inductance of said last-mentioned inductance coils to a relative value effective to establish the junction of the latter coils at the electrical center of said winding and to a combined value effective to tune said winding to said selected intermediate frequency.

3. In a frequency-modulation receiver including an intermediate frequency amplifier, a frequency discriminator comprising: a pair of electron discharge devices each having first and second electrodes; a pair of impedance elements series connected between said first electrodes; first and second series connected inductance coils inductively isolated from each other and coupled to said amplifier to form a component of a tuned output circuit therefor; an adjustable element for varying the inductive value of said first inductance coil to tune said output circuit to the selected intermediate frequency of said receiver; a winding comprising a further pair of series connected inductance coils connected between said second electrodes and individually inductively coupled to said second inductance coil with unequal coupling values; a connection extending from the junction of said further pair of inductance coils to the junction of said impedances; and separate, adjustable elements for individually, respectively permeability-adjusting of said last-mentioned inductance coils to inductances having a combined value effective to tune said winding to a predetermined frequency and having a relative value effective to establish the junction of the latter coils at an electrical point on said winding displaced from the electrical center thereof by an amount sufficient to compensate for the effect produced on a characteristic of said discriminator by the inequality of the afore-mentioned coupling values.

JOSEPH C. SPINDLER.

References Cited in the file of this patent

UNITED STATES PATENTS

| Number | Name | Date |
|---|---|---|
| 2,173,907 | Kirkwood | Sept. 26, 1939 |
| 2,227,035 | Schlesinger | Dec. 31, 1940 |
| 2,242,661 | Rust | May 20, 1941 |
| 2,243,414 | Carlson | May 27, 1941 |
| 2,380,389 | Andrews | July 31, 1945 |
| 2,399,779 | Willoughby | May 7, 1946 |
| 2,404,026 | Beard et al. | July 16, 1946 |
| 2,417,191 | Fox | Mar. 11, 1947 |
| 2,448,908 | Parker | Sept. 7, 1948 |
| 2,449,148 | Sands | Sept. 14, 1948 |